US 6,390,432 B1

(54) ADJUSTABLE AND DETACHABLE MOUSE PAD SUPPORT AND KEYBOARD SUPPORT HAVING THE SAME

(75) Inventors: Craig L. VanderHeide, Comstock Park; David H. Hodge, Hopkins, both of MI (US)

(73) Assignee: Knape & Vogt Manufacturing Company, Grand Rapids, MI (US)

( * ) Notice: Subject to any disclaimer, the term of this patent is extended or adjusted under 35 U.S.C. 154(b) by 0 days.

(21) Appl. No.: 09/518,795

(22) Filed: Mar. 3, 2000

Related U.S. Application Data

(60) Provisional application No. 60/123,042, filed on Mar. 5, 1999.

(51) Int. Cl.[7] ............................................. A47B 91/00
(52) U.S. Cl. ............... 248/346.01; 248/918; 248/118.1; 248/118; 108/50.01; 108/90
(58) Field of Search ................................. 248/918, 118, 248/118.1, 346.01, 288.31, 289.11; 108/50.01, 65, 69, 90, 64, 139

(56) References Cited

U.S. PATENT DOCUMENTS

| | | | |
|---|---|---|---|
| 5,031,867 A | 7/1991 | Cotterill | 248/284.1 |
| 5,119,742 A | 6/1992 | Simmie | 108/152 |
| 5,211,367 A | 5/1993 | Musculus | 248/279.1 |
| 5,257,767 A | 11/1993 | McConnell | 248/284.1 |
| 5,342,006 A | 8/1994 | Tice | 248/118 |
| 5,351,897 A | 10/1994 | Martin | 248/118 |
| 5,357,873 A | 10/1994 | Hilton | 108/50.01 |
| 5,377,951 A | 1/1995 | Johnson et al. | 248/639 |
| 5,429,337 A | 7/1995 | Poole | 248/442.2 |
| 5,443,237 A | 8/1995 | Stadtmauer | 248/441.1 |
| D367,387 S | 2/1996 | Sweere | 248/918 |
| 5,490,710 A | 2/1996 | Dearing et al. | 297/162 |
| 5,509,628 A | 4/1996 | Noble | 248/118 |
| 5,522,572 A | 6/1996 | Copeland et al. | 248/118 |
| 5,533,697 A | 7/1996 | Fletcher et al. | 248/146 |
| 5,564,667 A | 10/1996 | Copeland et al. | 248/278.1 |
| 5,636,822 A | 6/1997 | Hendershot et al. | 248/346.01 |
| 5,655,743 A | 8/1997 | Gillis | 248/346.01 |
| 5,692,712 A | * 12/1997 | Weinschenk, Jr. et al. | 248/118 |
| 5,704,698 A | 1/1998 | Lin | 312/208.1 |
| 5,730,408 A | * 3/1998 | McAllister et al. | 248/288.51 |
| 5,832,840 A | * 11/1998 | Woof | 108/6 |
| 5,836,560 A | * 11/1998 | Kaplan et al. | 248/286.1 |
| 6,012,693 A | * 1/2000 | Voeller et al. | 248/280.11 |

OTHER PUBLICATIONS

Fris Office Products, Holland, Michigan, 1996, pp. 65, 381, 383, 384.
Baer Supply Company, 1996, pp. 9 and 10.

* cited by examiner

*Primary Examiner*—Ramon O. Ramirez
*Assistant Examiner*—Holly N. Sy
(74) *Attorney, Agent, or Firm*—McGarry Bair LLP

(57) ABSTRACT

A mouse pad support adapted for mounting to a keyboard support and having a platform adapted to support a computer mouse, a connector arm adapted for mounting to the keyboard support, and a joint mounting the connector arm to the platform for swivel movement of the platform with respect to the connector arm. The joint typically includes ball and socket portions. The mouse pad support has a connector adapted to removably mount the connector arm to a complementary pocket in the keyboard support without the use of tools. A keyboard support includes a first platform having a pocket for receiving a connector on a connector arm, and a second platform adapted to support a computer mouse, the connector arm extending between the first and second platforms for detachably mounting to the first platform and for adjustably mounting the second platform relative to the first platform.

37 Claims, 7 Drawing Sheets

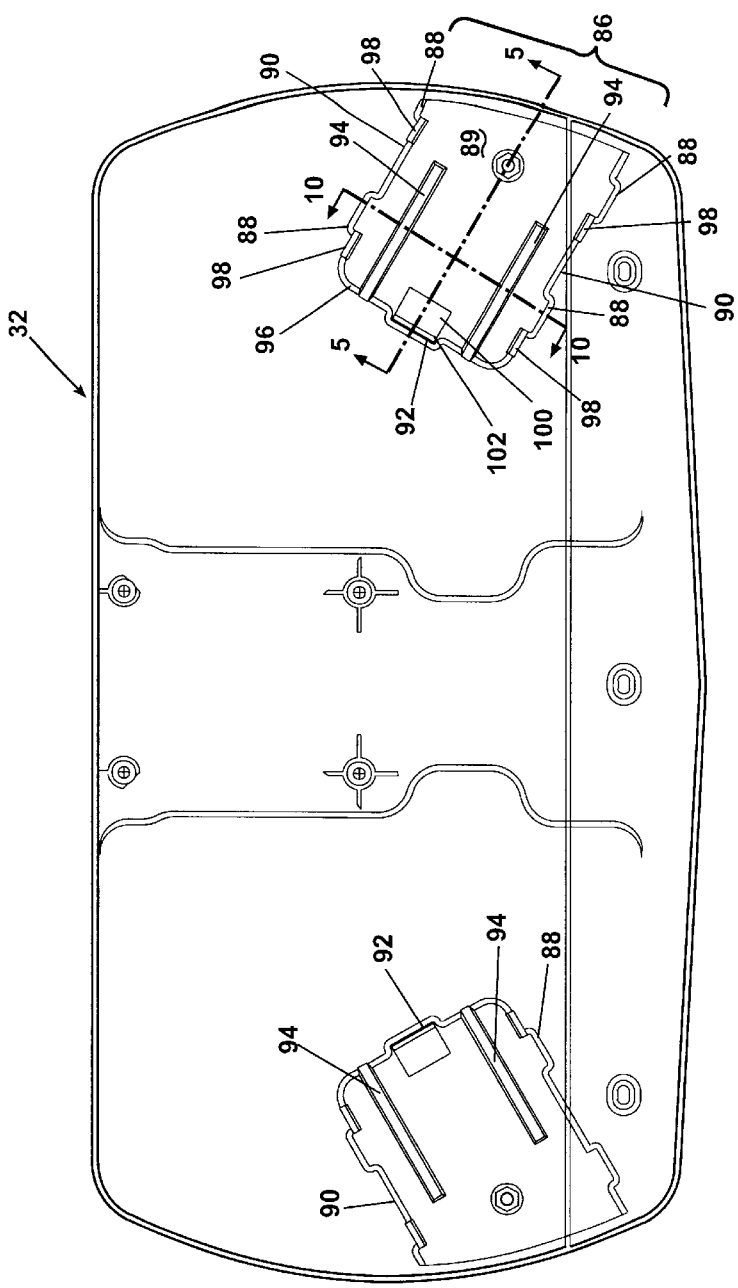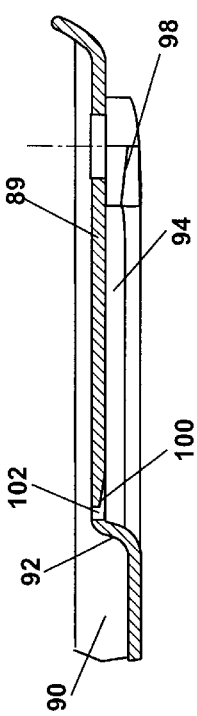
Fig. 4
Fig. 5

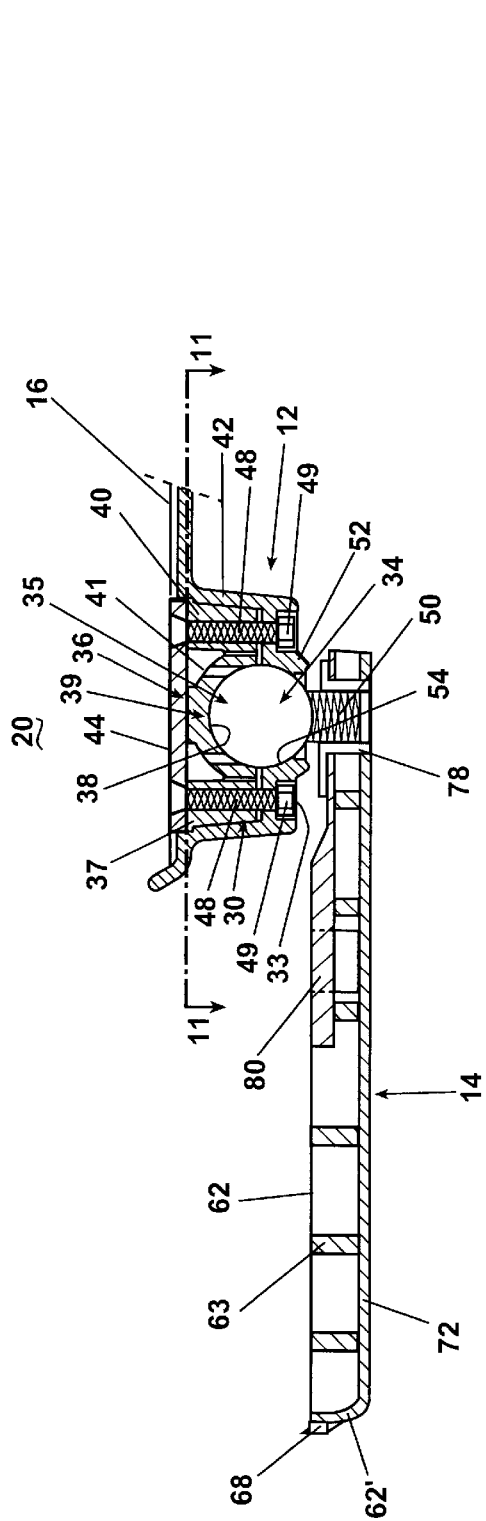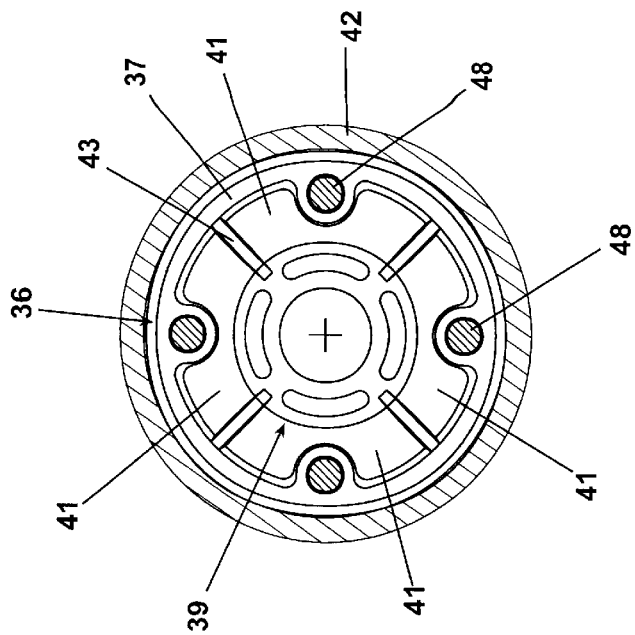

ADJUSTABLE AND DETACHABLE MOUSE PAD SUPPORT AND KEYBOARD SUPPORT HAVING THE SAME

CROSS-REFERENCE TO RELATED APPLICATION

This application claims the benefit of U.S. Provisional Patent Application No. 60/123,042, filed Mar. 5, 1999.

BACKGROUND OF THE INVENTION

1. Field of the Invention

The present invention relates to a mouse pad support. More particularly, this invention relates to a mouse pad support that is removably coupled to a computer keyboard support without the use of fastening devices or tools. In another of its aspects, the invention relates to a mouse pad support that has a swivel mechanism for adjusting the mouse pad support relative to a keyboard support. In yet an additional aspect, the invention relates to a keyboard support having a mouse pad support adjustably and detachably coupled thereto.

2. Description of the Related Art

Computers have now become commonplace in the work environment and, in a broadest sense, typically comprise a processing unit with a detached monitor and keyboard unit operably connected thereto. The monitor is typically placed on a work surface and the keyboard is typically placed on a keyboard support. The keyboard support can comprise the work surface as well, or on a keyboard support such as a keyboard tray mounted to the work surface. These types of keyboard trays are typically adjustably mounted to an underside of the work surface to accommodate the varying ergonomics of different users of the computer.

The advent of graphical user interfaces have a user of a computer operating system to perform commands and interact with applications running on the computer by merely pointing and clicking on items displayed on the computer monitor. This has necessitated the use of a pointing device, or a "mouse," also interconnected with the computer processing unit which a user can operate by sliding the mouse over a textured surface and clicking on button(s) provided on the mouse.

The mouse is typically supported on a mouse "pad", which provides sufficient surface area on which the user can slide the mouse and submit commands to the processing unit therewith. This mouse pad is typically supported on either the worksurface or a separate platform, typically supported by the keyboard tray.

The use of a mouse (or any other point-and-click device such as a trackball or stylus pad) has complicated the ergonomics of the user, typically seated in front of the computer monitor and typing on the keyboard provided on the keyboard support. In addition, employers have become more sensitive to such ergonomics as a result of the raised awareness of repetitive stress disorders sometimes encountered by users of computers in the workplace. Some users prefer that the mouse be located at a different angular position than their preferred keyboard support position. Some users are left-handed versus right-handed, and would prefer that their mouse be located on a particular side of the keyboard support or work surface.

One example of an adjustable mouse pad support is shown in U.S. Pat. No. 5,522,572 to Copeland et al., issued Jun. 4, 1996, which discloses a mouse pad support for both right- and left-handed users wherein a user can switch the effective side of the mouse pad from left to right by sliding a pair of interconnected mouse pads along rails on the keyboard tray to expose either a right or left side mouse pad. A user can also pivotably adjust the effective mouse pad once the mouse pads are located on the desired side of the keyboard tray by tightening the interconnected mouse pads on a threaded shaft which interconnects the mouse pads.

However, this and other prior art attempts to produce an easy to manufacture and assemble mouse pad and keyboard support associated therewith have fallen short. First, users typically cannot change the angle of the mouse pad relative to the keyboard support except by rotating the mouse pad about an axis that is typically planar with the keyboard support. For example, in the Copeland reference, the mouse pads are rotatable with respect to each other about an axis planar with the keyboard tray, i.e., along a threaded shaft extending between the mouse pads. Second, users typically cannot easily re-configure a mouse pad for a left-handed user from a right-handed configuration, or vice versa, except to purchase two mouse pad supports such as that shown in the Copeland reference.

SUMMARY OF THE INVENTION

In one aspect, the invention relates to a mouse pad support adapted for mounting to a keyboard support comprising a platform adapted to support a computer mouse, a connector arm adapted for mounting to the keyboard support, and a joint mounting the connector arm to the platform for swivel movement of the platform with respect to the connector arm about a generally vertical axis for adjustably mounting the connector arm to the platform. The platform can thereby be adjustably positioned relative to the keyboard support.

The joint can comprise a universal joint mounting the connector arm to the platform for movement of the platform with respect to the connector arm about multiple axes. The joint can comprise a ball-and-socket joint. A lower socket can be formed in the platform defining a portion of a ball socket. An upper socket portion can form a complementary portion of the ball socket with the lower socket and in register with the lower socket. The upper socket can include at least one resilient finger which resiliently grip a ball positioned in the ball socket. The at least one resilient finger preferably comprises four resilient fingers. A clamp can be provided for clamping the upper and lower sockets together.

The ball can have a threaded stud thereon, wherein the connector arm further comprises a threaded socket and the threaded stud on the ball is received in the threaded socket to fixedly mounted the ball to the connector arm. The connector arm can further comprise an interior latticework for adding structural support to the connector arm and resisting torsional and shear stresses imparted to the arm during adjustment and use of the platform.

The connector arm can further comprise a cover plate having an opening in register with the threaded socket whereby the cover plate is retained over at least a portion of the connector arm. The connector arm can preferably have at least two tabs which extend laterally from the connector arm in spaced relationship from the threaded socket whereby the tabs are adapted to mount the connector arm to the keyboard support. The socket can include at least one resilient finger which resiliently grips a ball positioned in the socket.

In another of its aspects, the invention relates to a mouse pad support adapted for mounting to a keyboard support comprising a platform adapted to support a computer mouse, a connector arm mounted to the platform and adapted for mounting to the keyboard support, and a connector adapted to removably mount the connector arm to a complementary-configured pocket in the keyboard support. The connector preferably comprises at least two locking tabs extending laterally from the connector arm for slidable receipt within the complementary-configured pocket. The locking tabs can thereby be received within the pocket in the keyboard support to detachably mount the connector arm to the keyboard support without the use of tools.

A joint can be provided for mounting the connector arm to the platform for swivel movement of the platform with respect to the connector arm about a generally vertical axis. The joint can preferably comprise a universal joint mounting the connector arm to the platform for movement of the platform with respect to the connector arm about multiple axes. The joint preferably comprises a ball-and-socket joint. The ball further comprises a threaded stud thereon, the connector arm further comprises a threaded socket, and the threaded stud on the ball can be received in the threaded socket to fixedly mount the ball to the connector arm.

The connector arm can be provided with an interior latticework for adding structural support to the connector arm and resisting torsional and shear stresses imparted to the arm during adjustment and use of the platform. The connector arm can further comprise a cover plate mounted to at least a portion of the connector arm at the mounting between the connector arm and the platform whereby the cover plate is adapted to conceal a portion of the connector arm exposed to view between the platform and the keyboard support.

The connector preferably comprises a detent tab extending axially from an end of the connector arm adjacent to the connector and having a depending flange thereon whereby the flange is adapted to releasably retain the connector arm to the complementary-configured pocket in the keyboard support.

In an additional aspect, the invention relates to a keyboard support having an adjustable mouse pad support mounted thereto, comprising a first platform adapted to support a keyboard, the first platform having a pocket with at least one retainer therein, a second platform adapted to support a computer mouse, and a connector arm extending between and mounted to the first and second platforms. The connector arm preferably has a connecting portion adapted to fit within the pocket on the first platform and further includes a first connector which is releasably retained by the retainer on the first platform to detachably mount the connector arm to the first platform. The connector arm also preferably has a second connector spaced from the first connector which adjustably mounts the second platform to the connector arm. The second platform can thereby be adjusted relative to the first platform by the second connector and the connector arm and the second platform can be removed from the first platform by dismounting the first connector from the pocket on the first platform.

The pocket in the first platform can comprise at least two opposed sidewalls, the retainer is formed in the sidewalls and has at least one slot for releasably supporting the first connector of the connector arm. The sidewalls can further comprise at least one indentation adjacent to the at least one slot for insertion and sliding movement mounting of the connecting portion of the connector arm to the retainer of the pocket of the first platform.

The pocket preferably comprises a detent receptor and the first connector further comprises a detent which is received in the detent receptor when the connecting portion of the connector arm is seated in the pocket of the first platform.

The receipt of the detent within the detent receptor preferably resists axial withdrawal of the connecting portion from the socket. The pocket can further comprise a bottom wall having at least one guide rail for seating the connecting portion of the connector arm within the pocket.

The first platform can further comprise a second pocket spaced from the first pocket for removably positioning the connector arm in one of the first and second pockets.

The second connector preferably comprises a universal joint mounting the connector arm to the second platform for movement of the second platform with respect to the connector arm about multiple axes. The joint can comprise a ball-and-socket joint. The ball can further comprise a threaded stud thereon, the second connector of the connector arm can further comprise a threaded socket, and the threaded stud on the ball can be received in the threaded socket to fixedly mount the ball to the connector arm.

The connector arm can further comprise an interior latticework for adding structural support to the connector arm and resisting torsional and shear stresses imparted to the arm during adjustment and use of the platform. The keyboard support can be a keyboard tray. The keyboard support can also be a work surface.

BRIEF DESCRIPTION OF THE DRAWINGS

In the drawings:

The features and inventive aspects of the present invention will become more apparent upon reading the following detailed description and drawings, of which the following is a brief description:

FIG. 4 is a bottom view of a keyboard platform formed in accordance with the teachings of this invention;

FIG. 5 is a sectional view of the keyboard platform taken along the line 5—5 shown in FIG. 4;

FIG. 9 is a sectional view of the mouse pad assembly shown in FIG. 1 taken along the line 9—9 of FIG. 2;

FIG. 11 is a sectional view taken along lines 11—11 of FIG. 9.

DESCRIPTION OF THE PREFERRED EMBODIMENT

Figure 1:
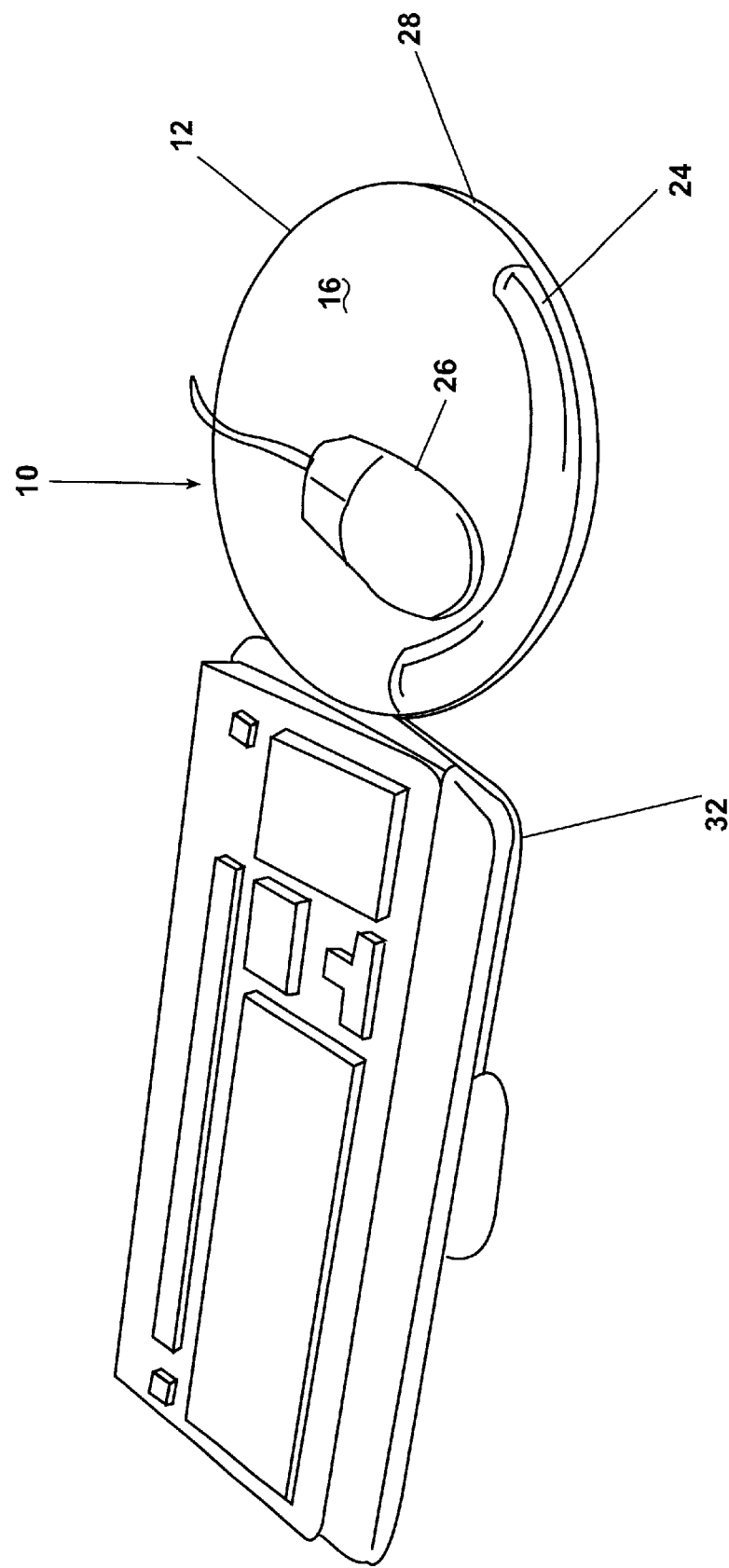
FIG. 1 is a perspective view of a mouse pad support and keyboard platform assembly formed in accordance with the teachings of this invention.
Figure 2:
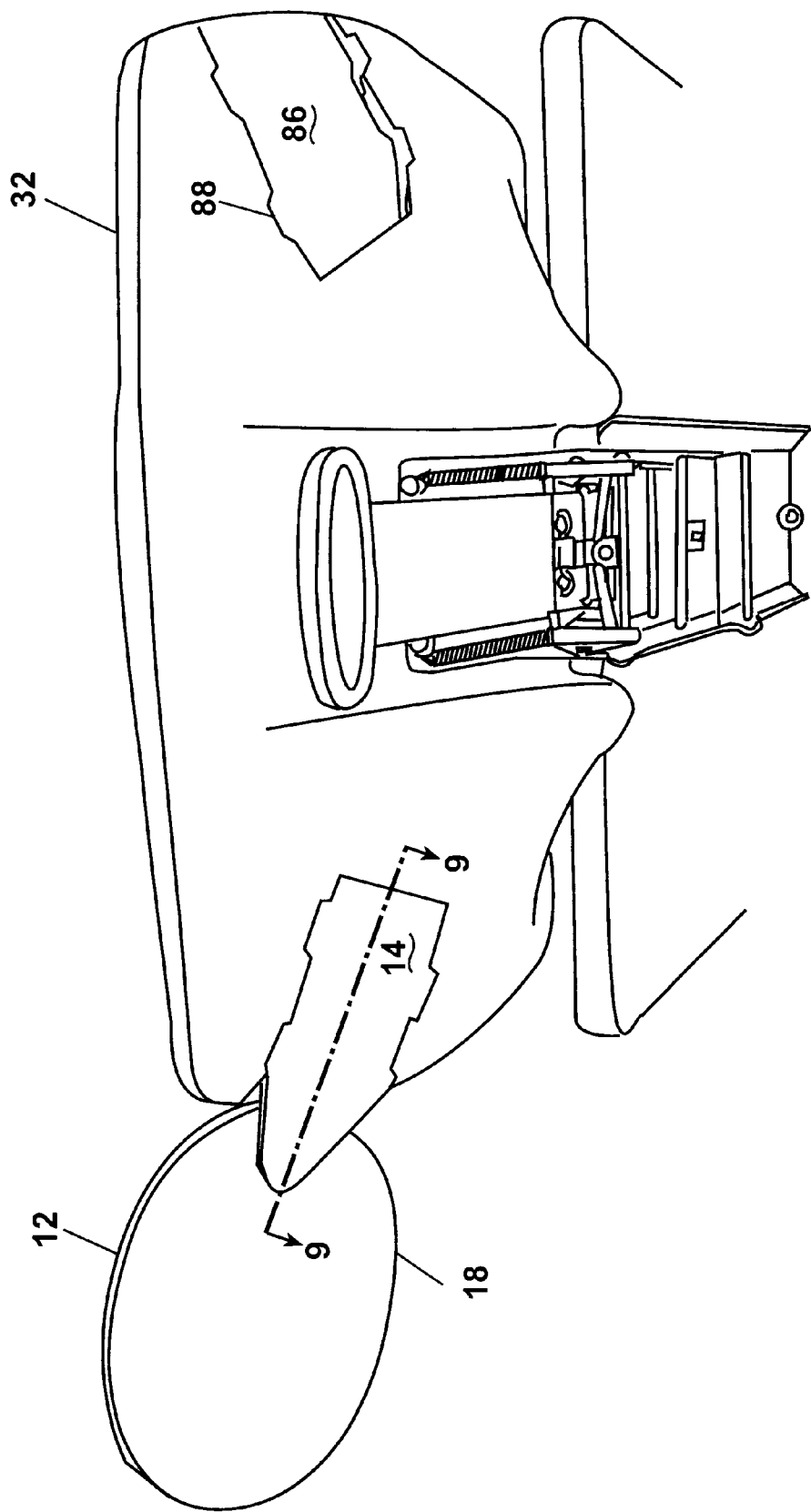
FIG. 2 is a bottom view of the mouse pad support and keyboard platform assembly shown FIG. 1.
Figure 3:
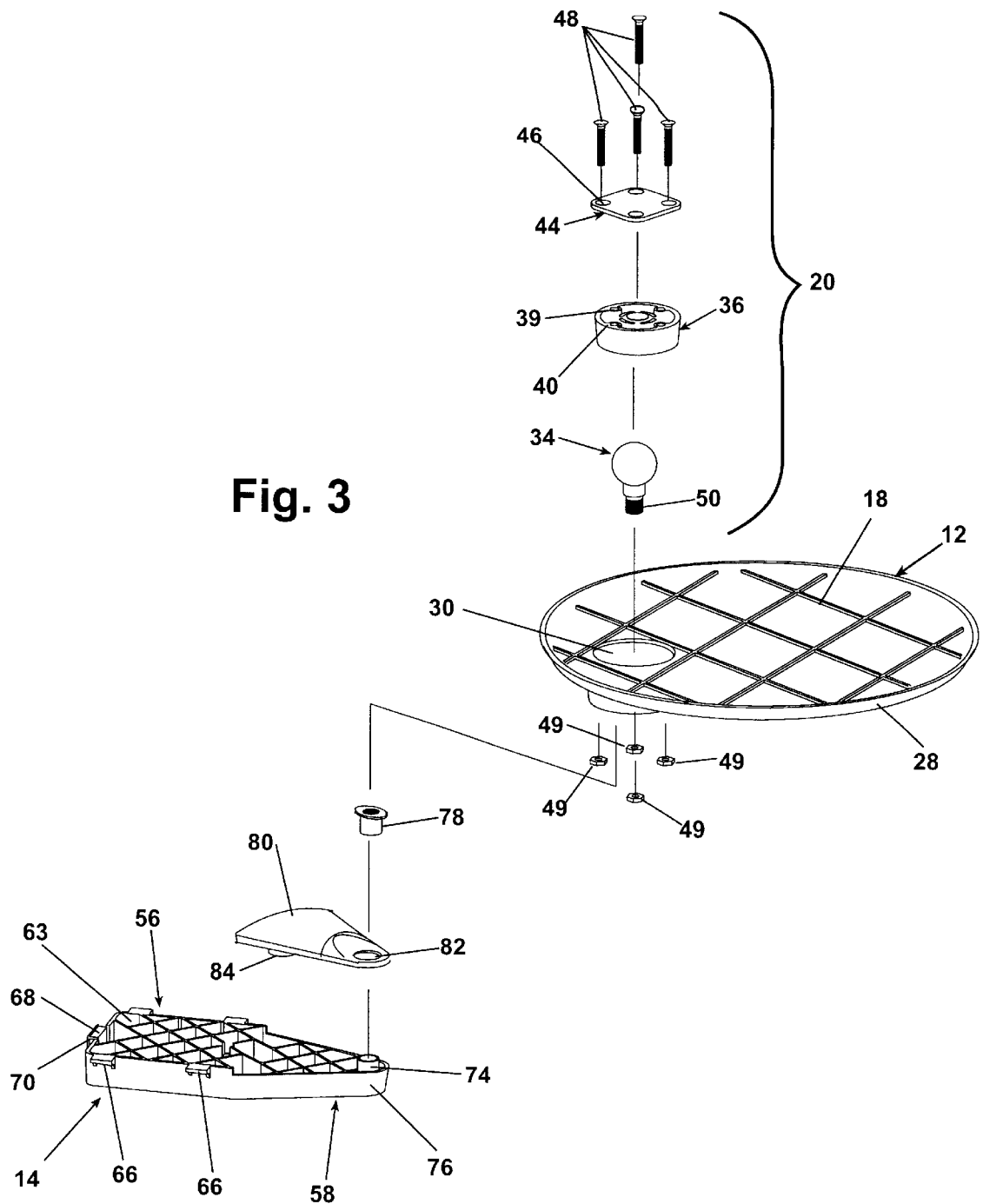
FIG. 3 is an exploded view of the mouse pad support shown in FIG. 1.

Referring now to the drawings and to FIGS. 1–3 in particular, a mouse pad support 10 according to the present invention is coupled to a computer keyboard 32 without the use of fastening devices or fastening tools. The mouse pad support 10 includes a platform 12 and a connecting arm 14.

The platform 12 is a circular shaped member fabricated of a hard plastic material, for example, by injection molding. It will be appreciated that the other suitable materials and geometric configurations may be used to fabricate the platform 12. The platform 12 includes a flexible pad 16, a lower plate 18 and a ball and socket joint 20.

The pad 16 includes a top surface which has an integrally formed wrist rest 24 extending upwardly therefrom. The wrist rest 24 includes a smooth, contoured outer surface sized to accommodate the wrist of a user during manipulation of a mouse 26 and is made from a soft, resilient material.

The lower plate 18, as illustrated in FIG. 3, includes an upwardly extending sidewall surface 28. FIG. 1 shows the pad 16 covering the lower plate 18 so as to form a cavity enclosed between the pad 16 and the lower plate 18 and surrounded by the sidewall surface 28. The sidewall surface 28 retains the pad 16 in place on the lower plate 18.

The lower plate 18 defines a lower socket 30 for receiving the ball and socket joint 20. The lower socket 30 is partially closed by an annular bottom wall 52 as shown in FIG. 9. The annular bottom wall 52 includes a plurality of openings 33 for receiving fasteners 48 as discussed below.

Turning now to a discussion of the ball and socket joint 20, as depicted in FIG. 9, the ball and socket joint 20 is positioned in the lower socket 30 formed in the lower plate 18. As will become clear from the discussion herein, the ball and socket joint 20 imparts frictionally restrained universal movement to the mouse pad support 10 relative to the keyboard support 32.

The ball and socket joint 20 includes a ball stud 34 with a spherically-shaped upper portion 35 and a threaded stud 50. The top surface of the spherically-shaped upper portion 35 is received in an upper socket 36. As shown in FIGS. 9 and 11, the upper socket 36 is a disc-shaped plastic member having a central portion 39 and an outer rim 37 connected to each other by four radial ribs 43. The radial ribs 43 define four integral spring fingers 41 which together define semi-spherical inner surface 38. A plurality of axial openings 40 are spaced around the outer rim 37. The semi-spherical inner surface 38 receives the upper portion of the spherically-shaped upper portion 35 of the ball stud 34.

The radius of curvature of the spherically-shaped upper portion 35 of the ball stud 34 and the semi-spherical inner surface 38 are substantially the same so that upper portion of the spherically-shaped upper portion 35 fits snuggly within the semi-spherical inner surface 38 of the upper socket 36. The spring fingers 41 are biased against the upper portion of the spherically-shaped upper portion 35 of the ball stud 34 to maintain constant pressure on the upper portion 35. In this manner, the spring fingers 41 form an integral spring and the need for a separate spring is avoided. The ball and socket joint 20 further includes a support plate 44 having a series of openings 46 which receive screws 48. The screws 48 are also received in the openings 40 of the upper socket 36.

The lower socket 30 is formed by a depending side wall 42 and a bottom wall 52 having a central opening 54 formed by a partial spherical surface. The bottom wall 52 has a series of openings 33 which align with the openings 40 in the upper socket and receive the screws 48.

The spherical upper surface 35 of the ball stud 34 seats on the partial spherical surface of the central opening 54 of the lower socket 30. Thus a ball socket is formed from the partial spherical surfaces of the socket central opening 54 and the upper socket spherical inner surface 38. This ball socket captures the spherically shaped upper portion of the ball stud 34 and frictionally holds the ball stud with respect to the platform 12 when the nuts 49 are tightened onto the screws 48. However, the platform 12 is slightly movable with respect to the ball stud 34 against the frictional forces between the ball socket and the ball stud spherically shaped upper portion. In the preferred embodiment, the nut and bolt combination 48, 49 is used to tighten the socket. Other adjustable fasteners can also be used for this purpose.

Figure 6:
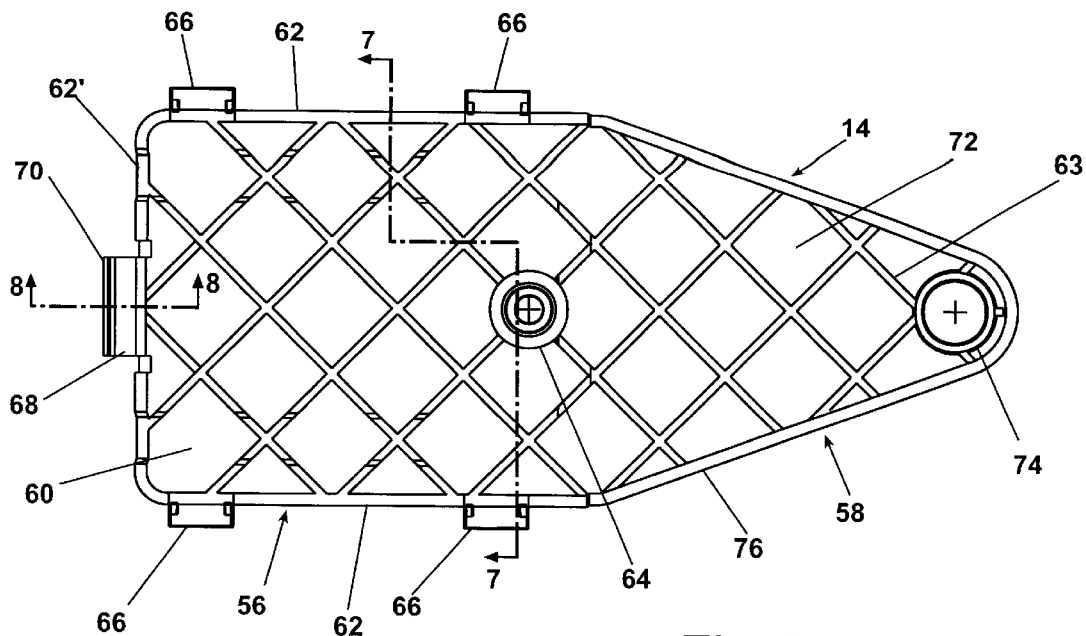
FIG. 6 is a top view of the connecting arm portion of the mouse pad support shown in FIG. 1.
Figure 7:
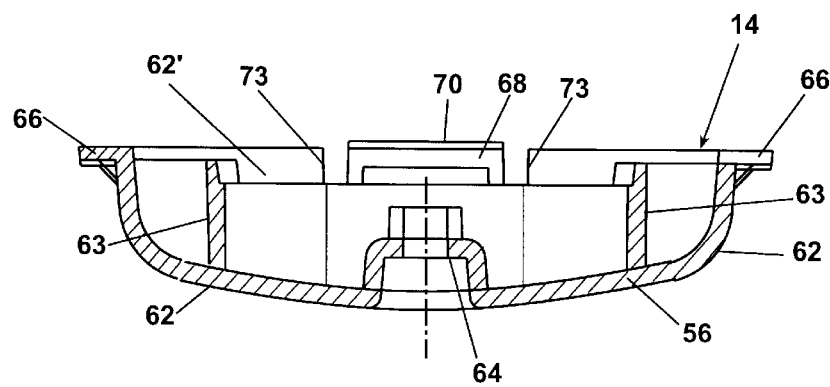
FIG. 7 is a sectional view of the connecting arm shown in FIG. 6 taken along the line 7—7.
Figure 8:
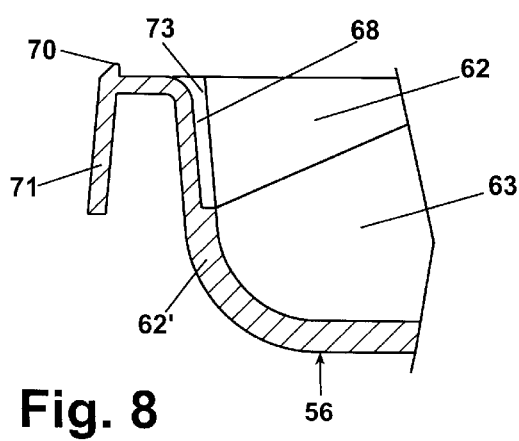
FIG. 8 is a sectional view of the connecting arm shown in FIG. 6 taken along the line 8—8.
Figure 10:
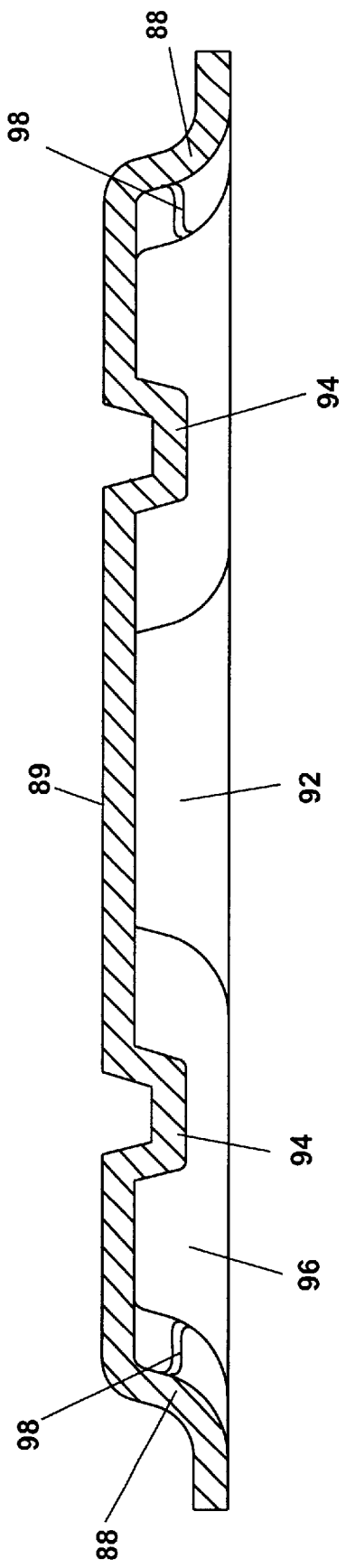
FIG. 10 is a sectional view of the keyboard platform shown in FIG. 4 taken along the line 10—10.

Now turning to a discussion of the connecting arm 14 as shown in FIG. 6, in the preferred embodiment, the connecting arm 14 is fabricated of a hard plastic material for example, by injection molding. The arm 14 includes a rectangularly shaped portion 56 integrally formed with a triangularly shaped portion 58.

The rectangularly shaped portion 56 includes a bottom wall 60 that in integrally formed with an open lattice structure 63 as shown in FIG. 6. The lattice structure 63 provides strength and rigidity to the arm 14 without unduly increasing the weight of the arm 14. The bottom wall 60 also is integrally formed with an upwardly extending support 64.

The outer periphery of the rectangularly shaped portion 56 in integrally formed with a plurality of outwardly extending tabs 66, 68. The tabs 66 are tapered in thickness from the right to the left as viewed from FIG. 6. In the preferred embodiment, as illustrated in FIGS. 3 and 6, four tabs 66 project outwardly from the upper sidewall 62 of the rectangularly shaped portion 56, and a single tab 68 projects outwardly from the rear portion 62' of the rectangularly shaped portion 56.

The rearwardly projecting tab 68 includes a raised lip 70 that extends linearly along the long edge of the tab 68. The tab 68 has a depending flange 71 and is separated from the rear wall 62' through slots 73. The tab 68 is thus flexibly joined to the rear wall and can be moved rearwardly by depressing the depending flange 71 toward the rear wall 62'.

The triangularly shaped portion 58 includes a bottom wall 72 that is also integrally formed with the open lattice structure 63. Additionally, the bottom wall 72 is integrally formed with an upwardly projecting socket protrusion 74. The protrusion 74 defines an open center and has a height approximately equal to the height of the sidewall portion 76 of the triangularly shaped portion 58.

The open top surface of the triangularly shaped portion 58 is closed by a cover plate 80. The cover plate 80 defines a downwardly extending support 84 that mates with the latticework 63 on the rectangularly shaped portion 56 to form a press-fit to keep the cover plate 80 in place on the connector arm 14. The cover plate 80 also defines an opening 82 that receives the protrusion 74 formed on the triangular portion 58.

As shown in FIG. 3, the socket 78 is press fit through the opening 82 and into protrusion 74 and can be retained with adhesives, if desired. When assembled, the top surface of the cover plate 80 provides a bearing surface for the socket 78, and the socket 78 includes a threaded surface that receives the threaded portion the ball stud 34. This arrangement provides a frictional engagement that couples the mouse pad platform 12 to the arm 14, and the opposite end of the arm 14 couples the mouse pad support 10 to a computer keyboard platform 32.

Turning to FIG. 4, the keyboard platform 32 includes a plurality of pockets 86. In the preferred embodiment, one pocket 86 is formed on both the left and right sides of the keyboard platform 32. The pockets 86 include bottom wall 89, a pair of side walls 90 and a rear wall 96. The side walls 90 have a plurality of outwardly projecting indentations 88, 92 formed therein.

As shown in FIG. 4, four indentations 88 are formed in the sidewalls 90, and a single indentation 92 is formed in the rear wall 96 of each pocket 86. Additionally, each bottom wall 89 has a pair of integrally formed guide rails 94. As shown in FIG. 4, the rearwardly extending indentation 92 is centered between the two guide rails 94. The side wall also defines a slot 98 adjacent each of the indentations 88. The slots 98 are tapered in depth from the outer end to the inner end or from right to left as seen in FIG. 5. Further, the bottom wall 89 further includes a tapered surface 100 terminating in a slot or further indentation 102.

FIGS. 1 and 2 show the arm 14 coupled to the keyboard platform 32. To install the arm 14 onto the keyboard platform 32, as shown in FIGS. 1, 2 and 6, the rectangularly shaped portion 56 of the arm 14 is received in one of the pockets 86. The tabs 66 register with the indentations 88 when the arm 14 is installed into the pocket 86. The arm 14 is then pushed into the pocket whereby the top surface of the rectangularly shaped portion 56 slides along the guide rails 94 and the tabs 66 enter the slots 98 until the lip 70 registers with the slot 102. The arm 14 will be locked into the pocket at that time. The arm 14 can be released from the pocket by pushing the flange 71 toward the end wall 62' and pulling outwardly on the arm with respect to the platform support 32. The tapered tabs 66 and the tapered slots 98 are important in tightly seating the arm 14 in the pocket 86. As the arm 14 is seated in the pocket, the tapered surfaces are tightly connected to each other so that the joint between the arm 14 and the pocket 86 is solid.

It will be understood that, although the keyboard support 32 is shown in the drawings as a typical keyboard tray, the keyboard support 32 can also be a typical worksurface which includes a bracket defining the pocket(s) 86 for mounting the mouse pad support 10 directly thereto.

While the invention has been specifically described in connection with certain specific embodiments thereof, it is to be understood that this is by way of illustration and not of limitation. Reasonable variation and modification are possible within the foregoing disclosure without departing from the spirit of the invention which is defined in the appended claims.

What is claimed is:

1. A mouse pad support adapted for mounting to a keyboard support comprising:
   a platform adapted to support a computer mouse;
   a connector arm adapted for mounting to the keyboard support; and
   a joint mounting the connector arm to the platform for swivel movement of the platform with respect to the connector arm about a generally vertical axis for adjustably mounting the connector arm to the platform so that the platform can be adjustably positioned relative to the keyboard support, the joint comprising a ball-and-socket joint mounting the connector arm to the platform for movement of the platform with respect to the connector arm about multiple axes,
      wherein the joint further comprises a lower socket formed in the platform defining a portion of a ball socket.

2. The mouse pad support of claim 1 and further comprising an upper socket forming a complementary portion of the ball socket with the lower socket and in register with the lower socket.

3. The mouse pad support of claim 2 wherein the upper socket includes at least one resilient finger which resiliently grips a ball positioned in the ball socket.

4. The mouse pad support of claim 3 wherein the at least one resilient finger comprises four resilient fingers.

5. The mouse pad support of claim 4 and further comprising a clamp for clamping the upper socket and the lower socket together.

6. The mouse pad support of claim 5 wherein the ball further comprises a threaded stud thereon, wherein the connector arm further comprises a threaded socket, wherein the threaded stud on the ball is received in the threaded socket to fixedly mounted the ball to the connector arm.

7. The mouse pad support of claim 6 wherein the connector arm further comprises an interior latticework for adding structural support to the connector arm and resisting torsional and shear stresses imparted to the connector arm during adjustment and use of the platform.

8. The mouse pad support of claim 7 wherein the connector arm further comprises a cover plate having an opening in register with the threaded socket whereby the cover plate is retained over at least a portion of the connector arm.

9. The mouse pad support of claim 8 wherein the connector arm further comprises at least two tabs which extend laterally from the connector arm in spaced relationship from the threaded socket whereby the at least two tabs are adapted to mount the connector arm to the keyboard support.

10. A mouse pad support adapted for mounting to a keyboard support comprising:
    a platform adapted to support a computer mouse;
    a connector arm adapted for mounting to the keyboard support; and
    a joint mounting the connector arm to the platform for swivel movement of the platform with respect to the connector arm about a generally vertical axis for adjustably mounting the connector arm to the platform so that the platform can be adjustably positioned relative to the keyboard support, the joint comprising a universal joint mounting the connector arm to the platform for movement of the platform with respect to the connector arm about multiple axes,
       wherein the joint comprises a ball and a socket and wherein the socket includes at least one resilient finger which resiliently grips a ball positioned in the socket.

11. The mouse pad support of claim 10 wherein the at least one resilient finger comprises four resilient fingers.

12. A mouse pad support adapted for mounting to a keyboard support comprising:
    a platform adapted to support a computer mouse;
    a connector arm adapted for mounting to the keyboard support; and
    a joint mounting the connector arm to the platform for swivel movement of the platform with respect to the connector arm about a generally vertical axis for adjustably mounting the connector arm to the platform so that the platform can be adjustably positioned relative to the keyboard support, the joint comprising a universal joint mounting the connector arm to the platform for movement of the platform with respect to the connector arm about multiple axes,
       wherein the joint comprises a ball and a socket and wherein the ball further comprises a threaded stud thereon, wherein the connector arm further comprises a threaded socket, wherein the threaded stud on the ball is received in the threaded socket to fixedly mount the ball to the connector arm.

13. A mouse pad support adapted for mounting to a keyboard support comprising:
    a platform adapted to support a computer mouse;
    a connector arm adapted for mounting to the keyboard support; and a joint mounting the connector arm to the platform for swivel movement of the platform with respect to the connector arm about a generally vertical axis for adjustably mounting the connector arm to the platform so that the platform can be adjustably positioned relative to the keyboard support, wherein the connector arm comprises a threaded socket, and further comprising a cover plate having an opening in register with the threaded socket whereby the cover plate is retained over at least a portion of the connector arm.

14. The mouse pad support of claim 13 wherein the connector arm further comprises an interior latticework for adding structural support to the connector arm and resisting torsional and shear stresses imparted to the arm during adjustment and use of the platform.

15. A mouse pad support adapted for mounting to a keyboard support comprising:

a platform adapted to support a computer mouse;

a connector arm adapted for mounting to the keyboard support; and a joint mounting the connector arm to the platform for swivel movement of the platform with respect to the connector arm about a generally vertical axis for adjustably mounting the connector arm to the platform so that the platform can be adjustably positioned relative to the keyboard support, wherein the connector arm further comprises a threaded socket and at least two tabs which extend laterally from the connector arm in spaced relationship from the threaded socket whereby the at least two tabs are adapted to mount the connector arm to the keyboard support.

16. A mouse pad support adapted for mounting to a keyboard support comprising:

a platform adapted to support a computer mouse;

a connector arm mounted to the platform and adapted for mounting to the keyboard support; and a connector adapted to removably mount the connector arm to a complementary-configured pocket in the keyboard support, the connector comprising at least two locking tabs extending laterally from the connector arm for slidable receipt within the complementary-configured pocket;

whereby the at least two locking tabs can be received within the pocket in the keyboard support to detachably mount the connector arm to the keyboard support without the use of tools.

17. The mouse pad support of claim 16 and further comprising a joint mounting the connector arm to the platform for swivel movement of the platform with respect to the connector arm about a generally vertical axis for adjustably mounting the connector arm to the platform so that the platform can be adjustably positioned relative to the keyboard support.

18. The mouse pad support of claim 17 wherein the joint comprises a universal joint mounting the connector arm to the platform for movement of the platform with respect to the connector arm about multiple axes.

19. The mouse pad support of claim 18 wherein the joint comprises a ball and a socket.

20. The mouse pad support of claim 19 wherein the ball further comprises a threaded stud thereon, wherein the connector arm further comprises a threaded socket, wherein the threaded stud on the ball is received in the threaded socket to fixedly mount the ball to the connector arm.

21. The mouse pad support of claim 16 wherein the connector arm further comprises an interior latticework for adding structural support to the connector arm and resisting torsional and shear stresses imparted to the connector arm during adjustment and use of the platform.

22. The mouse pad support of claim 16 wherein the connector arm further comprises a cover plate mounted to at least a portion of the connector arm at the mounting between the connector arm and the platform whereby the cover plate is adapted to conceal a portion of the connector arm exposed to view between the platform and the keyboard support.

23. The mouse pad support of claim 16 wherein the connector further comprises a detent tab extending axially from an end of the connector arm adjacent to the connector and having a depending flange thereon whereby the depending flange is adapted to releasably retain the connector arm to the complementary-configured pocket in the keyboard support.

24. A keyboard support having an adjustable mouse pad support mounted thereto, comprising:

a first platform adapted to support a keyboard, the first platform having a pocket with at least one retainer therein;

a second platform adapted to support a computer mouse;

a connector arm extending between and mounted to the first platform and the second platform;

the connector arm has a connecting portion adapted to fit within the pocket on the first platform and further includes a first connector which is releasably retained by the at least one retainer on the first platform to detachably mount the connector arm to the first platform; and the connector arm has a second connector spaced from the first connector which adjustably mounts the second platform to the connector arm;

whereby the second platform can be adjusted relative to the first platform by the second connector and the connector arm and the second platform can be removed from the first platform by dismounting the first connector from the pocket on the first platform.

25. The keyboard support of claim 24 wherein the pocket in the first platform comprises at least two opposed sidewalls, the retainer is formed in the at least two opposed sidewalls and has at least one slot for releasably supporting the first connector of the connector arm.

26. The keyboard support of claim 25 wherein the sidewalls further comprise at least one indentation adjacent to the at least one slot for insertion and sliding movement mounting of the connecting portion of the connector arm to the at least one retainer of the pocket of the first platform.

27. The keyboard support of claim 26 wherein the pocket further comprises a detent receptor and the first connector further comprises a detent which is received in the detent receptor when the connecting portion of the connector arm is seated in the pocket of the first platform, the receipt of the detent within the detent receptor resists axial withdrawal of the connecting portion from the pocket.

28. The keyboard support of claim 27 wherein the pocket further comprises a bottom wall having at least one guide rail for seating the connecting portion of the connector arm within the pocket.

29. The keyboard support of claim 24 wherein the pocket further comprises a bottom wall having at least one guide rail for seating the connecting portion of the connector arm within the pocket.

30. The keyboard support of claim 29 wherein the first platform further comprises a second pocket spaced from the first pocket for removably positioning the connector arm in either the first pocket or the second pocket.

31. The keyboard support of claim 24 wherein the first platform further comprises a second pocket spaced from the first pocket for removably positioning the connector arm in either the first pocket or the second pocket.

32. The keyboard support of claim 24 wherein the second connector comprises a universal joint mounting the connector arm to the second platform for movement of the second platform with respect to the connector arm about multiple axes.

33. The keyboard support of claim 32 wherein the universal joint comprises a ball and a socket.

34. The keyboard support of claim 33 wherein the ball further comprises a threaded stud thereon, wherein the second connector of the connector arm further comprises a threaded socket, wherein the threaded stud on the ball is received in the threaded socket to fixedly mounted the ball to the connector arm.

35. The keyboard support of claim 24 wherein the connector arm further comprises an interior latticework for adding structural support to the connector arm and resisting torsional and shear stresses imparted to the connector arm during adjustment and use of the second platform relative to the first platform.

36. The keyboard support of claim 24 wherein the keyboard support is a keyboard tray.

37. The keyboard support of claim 24 wherein the keyboard support is a work surface.

* * * * *